United States Patent
Barto

(10) Patent No.: US 11,030,576 B2
(45) Date of Patent: Jun. 8, 2021

(54) HEADS UP DISPLAY FOR MATERIAL HANDLING SYSTEMS

(71) Applicant: Dematic Corp., Grand Rapids, MI (US)

(72) Inventor: Aaron J. Barto, Grand Rapids, MI (US)

(73) Assignee: Dematic Corp., Grand Rapids, MI (US)

( * ) Notice: Subject to any disclaimer, the term of this patent is extended or adjusted under 35 U.S.C. 154(b) by 0 days.

(21) Appl. No.: 16/535,185

(22) Filed: Aug. 8, 2019

(65) Prior Publication Data

US 2019/0362301 A1    Nov. 28, 2019

Related U.S. Application Data

(62) Division of application No. 15/260,440, filed on Sep. 9, 2016, now Pat. No. 10,395,212.

(60) Provisional application No. 62/215,882, filed on Sep. 9, 2015.

(51) Int. Cl.
  *G06Q 10/08* (2012.01)
  *G06Q 30/00* (2012.01)
  *G06Q 50/28* (2012.01)

(52) U.S. Cl.
  CPC ......... *G06Q 10/087* (2013.01); *G06Q 30/018* (2013.01); *G06Q 50/28* (2013.01)

(58) Field of Classification Search
  CPC ..... G06Q 10/087; G06Q 30/018; G06Q 50/28
  USPC ....................................................... 705/28
  See application file for complete search history.

(56) References Cited

U.S. PATENT DOCUMENTS

| 5,380,994 A | 1/1995 | Ray |
| 6,148,291 A * | 11/2000 | Radican ............ G06Q 10/08 705/22 |
| 7,063,256 B2 | 6/2006 | Anderson et al. |
| 7,826,920 B2 | 11/2010 | Stevens et al. |

(Continued)

FOREIGN PATENT DOCUMENTS

WO    2004017156 A2    2/2004

OTHER PUBLICATIONS

CHI 2010: Interactions in the World, Kimberly A. Weaver et al., "An Empirical Task Analysis of Warehouse Order Picking Using Head-Mounted Displays", Apr. 10-15, 2010.

(Continued)

*Primary Examiner* — Garcia Ade
(74) *Attorney, Agent, or Firm* — Gardner, Linn, Burkhart & Ondersma LLP

(57) ABSTRACT

An inventory warehouse management system includes a portable computing device that is coupled to a heads up display and a scanner. The display is configured to display and interact with information received from the computing device. The scanner is operable to identify a container identification (ID) of a container in a warehouse. The computing device is operable to send the container ID to a server via a network. The computing device is operable to receive container information from the server in response to the container ID, and is further operable to communicate the container information to the display. The display is operable to initiate a delivery confirmation for the server when the container is delivered. The scanner and display are operable to audit a first container and provide an audit result of the first container to the server. The audit comprises container information compared with contents of the container.

20 Claims, 5 Drawing Sheets

(56) References Cited

U.S. PATENT DOCUMENTS

| | | | |
|---|---|---|---|
| 8,149,111 B2* | 4/2012 | Monroe | G16H 20/17 |
| | | | 340/539.12 |
| 8,355,961 B1* | 1/2013 | Ng | G06Q 10/08 |
| | | | 705/28 |
| 8,566,183 B1 | 10/2013 | Bonar et al. | |
| 2004/0183751 A1 | 9/2004 | Dempski | |
| 2013/0211977 A1 | 8/2013 | Lyon | |
| 2014/0291396 A1 | 10/2014 | Molisimo et al. | |
| 2015/0091789 A1 | 4/2015 | Alzate | |

OTHER PUBLICATIONS

International Search Report (Form PCT/ISA/210) and Written Opinion of the International Search Authority (Form PCT/ISA/237) from corresponding Patent Cooperation Treaty Application No. PCT/IB2016/055397, dated Dec. 15, 2016.

* cited by examiner

HEADS UP DISPLAY FOR MATERIAL HANDLING SYSTEMS

CROSS REFERENCE TO RELATED APPLICATIONS

This application is a divisional application of U.S. patent application Ser. No. 15/260,440, filed Sep. 9, 2016, now U.S. Pat. No. 10,395,212, which claims the filing benefit of U.S. provisional application Ser. No. 62/215,882, filed Sep. 9, 2015, which are hereby incorporated by reference herein in their entireties.

BACKGROUND OF THE INVENTION

The present invention is directed to a data handling technique in a warehouse system, and in particular to a method and system for managing container information in a warehouse system.

Currently, in order for an operator to query a status of a container or perform a validation of a product that was placed in the container, the user/operator is typically either at a desktop terminal or be utilizing a portable voice system (e.g., a wearable computer with a headset that provides audible information to an operator and provides the operator the ability to input similar information through voice recognition and/or predetermined voice commands). If using a desktop terminal, the user/operator would need to move a particular container from its current or original location and bring it to the terminal, as the terminal is not portable. Once there, the user/operator may scan the container (either through manual entry of barcodes, serial numbers and similar data or through the use of a barcode/QR code scanner or similar device) and receive information specific to that container. As noted above, the user or operator may use a voice device. While the upside of using a voice device is that it is portable and can be brought with the user/operator, the voice device is limited in the amount of information that can be delivered to the operator/user. Because the information is delivered via an audio output, the operator/user with a voice device typically only performs simple validations.

SUMMARY OF THE INVENTION

The present invention provides a method for use of a heads up display and portable computing device that combines the benefits of a traditional desktop terminal and a voice device, such that a user/operator may enter and receive information for containers using a system that has the portability of a voice system with the information that is normally delivered by a desktop terminal.

According to an aspect of the present invention, utilizing a heads up display connected to a portable computing device, an inquiry may be placed on the spot about container status of individual containers within a warehouse system. Such a heads up display and portable computing device provides a heads up system that is portable and allows for interfacing with an inventory system (sending and receiving information to/from the inventory system) through the heads up display and portable computing device, allowing an informed decision related to a container without requiring the use of a fixed terminal that is physically remote from the container in question. Such a system will allow a user/operator to be anywhere within a warehouse and input and/or retrieve relevant container information with an inventory system without having to leave their current location to access a fixed terminal.

According to an aspect of the present invention, a method for managing container information in a warehouse system includes identifying a container with a scanner. The scanner is coupled to a portable computing device. The container identification is sent by the portable computing device to a warehouse server. The portable computing device is connected to the warehouse server via a network. Information related to the container is received by the portable computing device from the warehouse server and communicated to a heads up display communicatively coupled to the portable computing device. The container is delivered to a target destination in the warehouse based in part on the container information. Confirming delivery of the container to the target destination by interacting with the heads up display. The delivery confirmation will occur at the time of delivery to the target destination.

The container information may include one or more of a current container state, a target destination, and container contents. The portable computing device may be connected to the warehouse server through a wireless network.

The portable computing device and heads up display may be physically separated from each other and coupled through a wireless network. The portable computing device and heads up display may in the alternative be physically integrated together.

According to an aspect of the present invention, a method for auditing containers in a warehouse includes identifying a container with a scanner. The scanner is communicatively coupled to a portable computing device. The container identification is sent by the portable computing device to a warehouse server. The portable computing device is communicatively coupled via a network to the warehouse server. Information related to the container is received by the portable computing device from the warehouse server and communicated to a heads up display communicatively coupled to the portable computing device. The container information is matched with the physical contents of the container. The warehouse server is notified by the portable computing device that an audit of the container has passed when the contents of the container match the container information for the container. In the alternative, the warehouse server is notified by the portable computing device that the audit of the container has not passed when the contents of the container does not match the container information for the container. If the audit has not passed, the warehouse system will send a notification to the portable computing device that the container is to be routed to a quality control area of the warehouse. This notification will be communicated to the heads up display.

The package and container information may include one or more of product descriptions, product images, quantity in the container, and a product warehouse location.

According to an aspect of the present invention, a method for performing blind quality checks on the contents of a container in a warehouse includes identifying a container. The container may be identified with a scanner. The scanner is communicatively coupled to a portable computing device. The container information is sent by the portable computing device to a warehouse server. The portable computing device is communicatively coupled via a network to the warehouse server. Information related to the container is received by the portable computing device from the warehouse server. The method also includes scanning each product in the container to acquire a product ID for each product in the container. Each product's ID is sent to the warehouse server for recording purposes. Once all product ID's within the container have been scanned, the portable computing device is used to indicate completion and the portable computing device delivers a PASS or FAIL status to the heads up display and to the warehouse server. The warehouse server sends an instruction to the portable computing device to send the container to its final destination if the quality checks pass. The instruction is communicated by the portable computing device to the heads up display.

During the blind quality checks, the container information and product information are not seen at the heads up display. In the alternative, the heads up display may receive the container information and product information, but masks it.

According to an aspect of the present invention, a method for performing open quality checks on the contents of a container in a warehouse includes identifying a container. The container may be identified with a scanner coupled to a portable computing device. The container information is sent by the portable computing device to a warehouse server. The portable computing device is coupled via a network to the warehouse server. Information related to the container is received by the portable computing device from the warehouse server and communicated to a heads up display that is coupled to the portable computing device. The products in the container are validated, based upon the received container information for the container. After the validation process completes, the warehouse server is notified with the heads up display, via the portable computing device, whether the container has received a PASS or FAIL status. The container is sent to its final destination if the quality checks pass.

According to an aspect of the present invention, an inventory warehouse management system includes a portable computing device communicatively coupled to a heads up display and a scanner communicatively coupled to the portable computing device. The scanner is operable to identify a container identification (ID) of a container in a warehouse. The portable computing device is operable to send the container ID to a warehouse server via a network. The portable computing device receives container information from the warehouse server in response to the container ID and communicates the container information to the heads up display. The heads up display is operable to initiate a delivery confirmation for the warehouse server when the container is delivered to a target destination. The target destination is based in part on the container information. The delivery confirmation occurs at the time of delivery at the target destination.

As discussed in detail herein, the use of a portable computing device coupled with a heads up display allows quality control checks, auditing, and container handling to be performed efficiently by providing a portable, hands-free, interface to a warehouse server that can be worn by a user/operator and carried throughout a warehouse. The use of a heads up display and portable computing device means that a stationary terminal is not needed. In other words, there is no need to move a container to a stationary terminal or to move back and forth between a container and a stationary terminal.

These and other objects, advantages, purposes and features of this invention will become apparent upon review of the following specification in conjunction with the drawings.

DESCRIPTION OF THE PREFERRED EMBODIMENTS

The present disclosure will now be described with reference to the accompanying figures, wherein the numbered elements in the following written description correspond to like-numbered elements in the figures.

As discussed herein, exemplary embodiments may be used to give a user/operator on a warehouse floor, or other similar location, the convenience of a standard desktop terminal environment with the portability of a voice unit of a voice system. As discussed above, a voice system utilizes a wearable computer with a headset that provides audio information to an operator and allows the operator to input similar audio information through the use of voice recognition and/or predetermined voice commands. Such a combination of capabilities and conveniences may be realized through the use of a heads up display in conjunction with a portable computing device. A heads up display will allow a person wearing them to view information while not necessarily impairing their normal line of sight or field of vision. Furthermore, the use of a heads up display may also allow a user of the heads up display to remain hands-free and keep their eyes on what they are working on.

Figure 1:
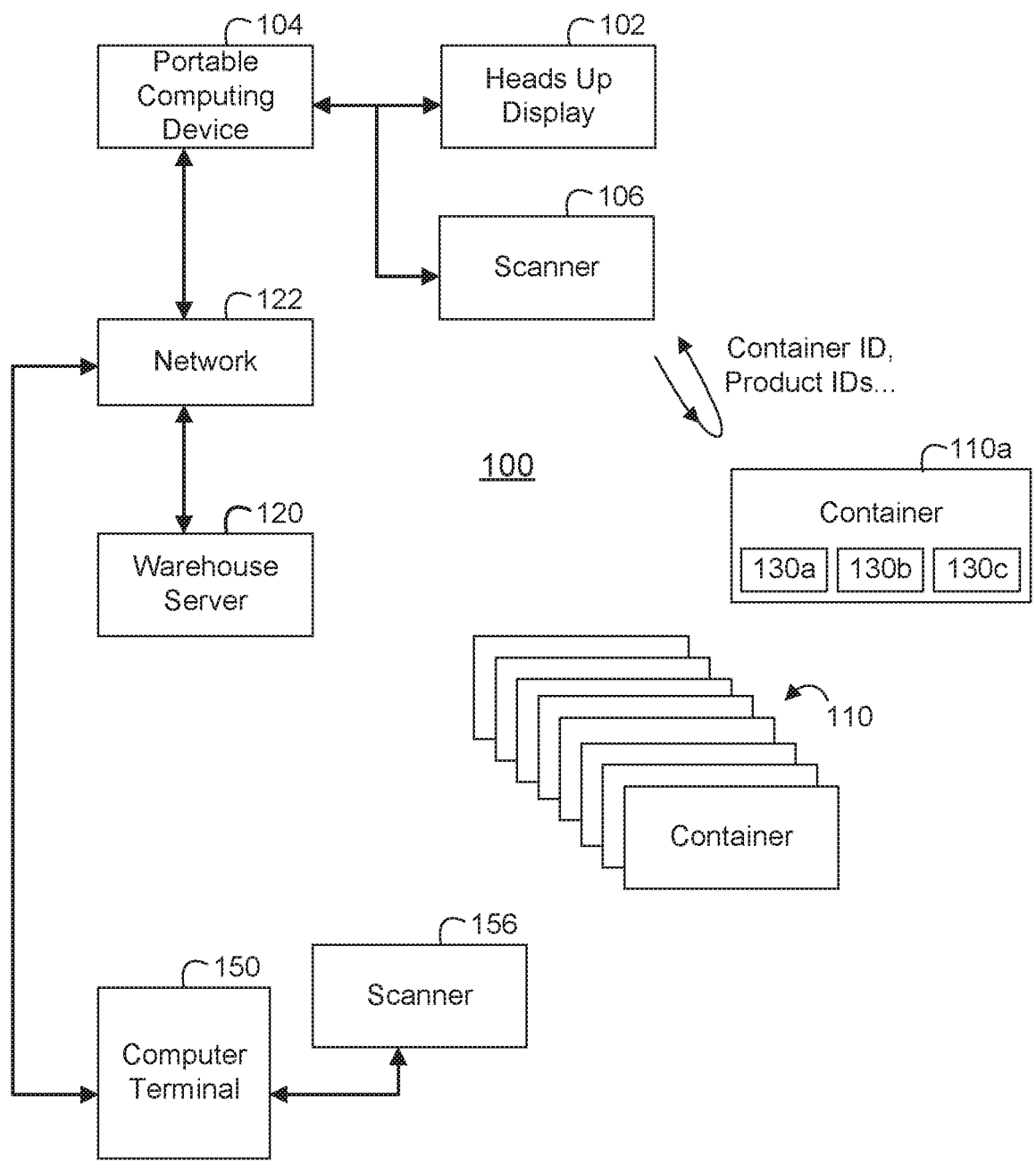
FIG. 1 is a block diagram illustrating an inventory management system in a warehouse in accordance with an embodiment of the present disclosure.

As illustrated in FIG. 1, an inventory warehouse management system 100, herein referred to as a warehouse system 100 includes a heads up display 102 connected to a portable computing device 104, allowing a user/operator to identify a particular container 110a out of a plurality of other containers 110 in a warehouse or other similar facility to an information system 120 via a scanner 106 (e.g., a Bluetooth scanner or a built-in scanner) and receive information related to that container 110a from the information system 120. As illustrated in FIG. 1, the information system of the warehouse system 100 may also be referred to as a warehouse server 120. As discussed herein, an exemplary information system 120 may be implemented with a remote computer system, such as a server that is communicatively coupled to the heads up display 102 (via the portable computing device 104) through a network 122. The network 122 may be implemented as a wireless network. The scanner 106 may be implemented as a barcode scanner, a QR scanner, an RFID scanner, or other similar scanning technology. These scanners 106 may also be implemented as Bluetooth wireless scanners 106 or as wireless scanners 106 using other similar technologies. The scanner 106 may also be implemented as a built-in option with the heads up display 102 or portable computing device 104.

As discussed herein, the scanner 106 may read one or more of: barcodes, QR codes, serial numbers, RFID tags, as well as other suitable coding arrangements to identify a particular container 110a. As discussed herein, a container's identification may be associated with specific container information. This accessing of container information with a portable computing device/heads up display 102/104 in a warehouse system 100 may allow a user/operator to make an on-the-spot informed decision as to how to handle a particular container 110a without having to resort to locating and going to a computer terminal 150, that is in a fixed location, to acquire the same container information. As also illustrated in FIG. 1, the fixed location computer terminal 150 may also utilize a scanner 156 and is also connected to the warehouse server 120 through the network 122, albeit through a wired Ethernet or other similar network connection.

A variety of heads up display/portable computing device combinations 102/104 are anticipated for use with embodiments of this present disclosure. For example, the heads up display 102 may be physically separated, but in communication with the portable computing device 104. In another example, the heads up display 102 and portable computing device 104 may be combined such that an exemplary heads up display 102 includes a portable computing device 104. There are a variety of heads up display/portable computing devices 102/104 available. A sample of available heads up display devices include Microsoft HoloLens, Google Glass, and Recon Jet heads up display devices.

Using a Heads Up Display in a Jackpot Lane:

A "jackpot lane" on a sorting mechanism of a warehouse is an area where containers 110 are sent when they are either not properly identified by a sorter scanner or that need some sort of attention (e.g., the sortation software does not have any place to send them, wrong product in container 110). There is typically a desktop terminal 150 for the warehouse system 100 located in this lane. When a user/operator identifies a container 110a, the operator must then turn and look at the terminal 150. In addition, depending on the location of the terminal 150 and/or the container 110a, the user/operator must walk to the terminal 150 in order to view the information presented.

Utilizing a heads up display/portable computing device 102/104, a user/operator working in this area (the Jackpot Lane) receives this container information (based upon the container's container ID) delivered straight to their heads up display 102. There is no necessity to look at a remote terminal 150 and/or walk closer to it. This information contains, but is not limited to: a container's current state, a container's target destination, and the contents of a container (if known), which as discussed herein may include additional content information.

Armed with this information, the user/operator can then perform one of several actions to ensure that the container 110a is delivered to the proper location within the warehouse. Because the target destination is identified, the user/operator has the ability to manually deliver the container 110a to this location. The heads up display 102 offers additional benefits over a traditional terminal 150 in this action. With a traditional terminal 150, once the operator leaves the area, they must remember the final destination, whereas the user/operator utilizing the heads up display 102 always has the information. Once at the destination, the user/operator can then inform the warehouse system 100 that the container 110a has been delivered. This occurs via the heads up display 102 as user interaction is available. The benefit over the terminal 150 is that the delivery confirmation occurs at the time of the delivery. With the remote terminal 150, the user/operator would have to confirm delivery before they left the jackpot lane.

Figure 2:
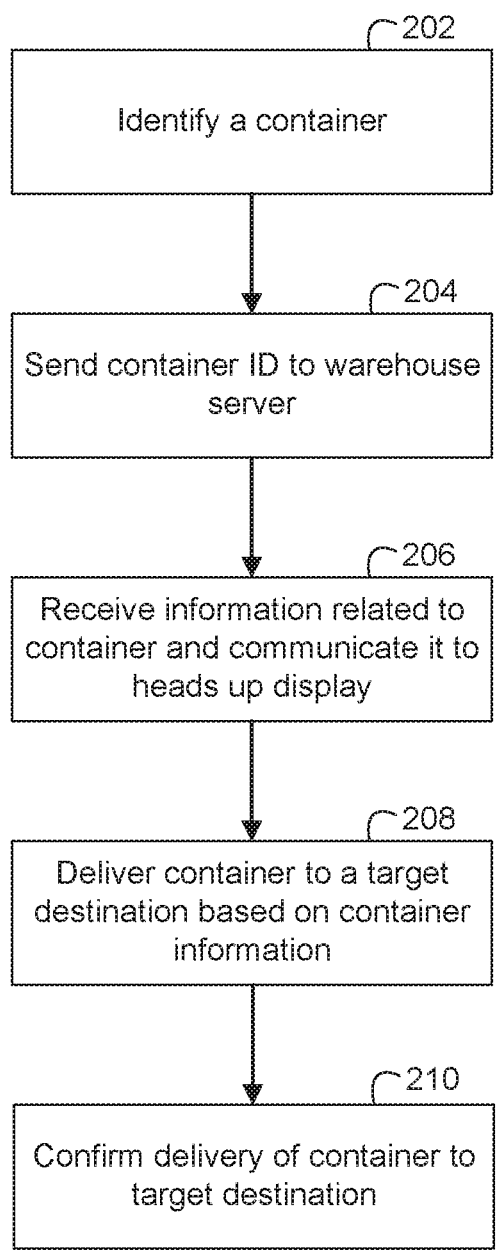
FIG. 2 is a flow diagram of a method for managing container information in a warehouse system in accordance with an embodiment of the present disclosure.

FIG. 2 is a flow diagram illustrating the steps to a method for managing container information in a warehouse system 100 utilizing a heads up display 102 connected to a portable computing device 104. As illustrated in FIG. 2, in step 202, a container 110a is identified with a scanner 106. As illustrated in FIG. 1, the scanner 106 retrieves a container ID from the container 110a. Each container 110 has a specific container ID to uniquely identify that container 110. As discussed herein, the scanner 106 may be a separate Bluetooth scanner or may be part of the heads up display 102 or the portable computing device 104.

In step 204 of FIG. 2, the retrieved container ID is sent by the portable computing device 104 to the warehouse server 120 via the network 122. The retrieved container ID is linked to container information for the particular container 110a. As noted above, the container information may include a state of the current container 110a, a target destination, and possibly contents of the container 110a. In step 206 of FIG. 2, the warehouse server 120, based upon the received container ID, sends container information for the container 110a to the portable computing device 104, which communicates the container information to the heads up display 102 for viewing by the user/operator.

In step 208 of FIG. 2, the user/operator may deliver the container 110a to a target destination based upon the related container information. In step 210 of FIG. 2, once the container 110a has been delivered to its target destination, the user/operator may confirm delivery of the container 110a by interacting with the heads up display 102 and delivering a delivery confirmation for the container 110a to the warehouse server 120.

Using a Heads Up Display in a Container Audit:

When utilizing a picking solution, a user/operator of a heads up display/portable computing device 102/104 may walk up to a particular container 110a out of a variety of containers 110 in the warehouse system 100 and validate that what the warehouse system 100 has recorded as packed into the container 110a matches the physical contents (130a, 130b, 130c) of the container 110a. As discussed herein, upon identifying a particular container 110a, container information for the container 110a is delivered to the operator. This container information includes, but is not limited to: product 130 descriptions, product images, quantity of products 130 in the container 110a, and product warehouse locations.

Armed with this container information, a user/operator using a heads up display 102 is able to match this information with the container's physical contents 130a-130c. If the contents (e.g., products 130a-103c) in the container 110a match the corresponding container information, the user/operator may inform the warehouse system 100, via the heads up display 102, that an audit has occurred and has passed. If the contents do not match, the user/operator may inform the warehouse system 100 of the failure and the warehouse system 100 will then direct the container 110a to a quality control area of the warehouse.

Figure 3:
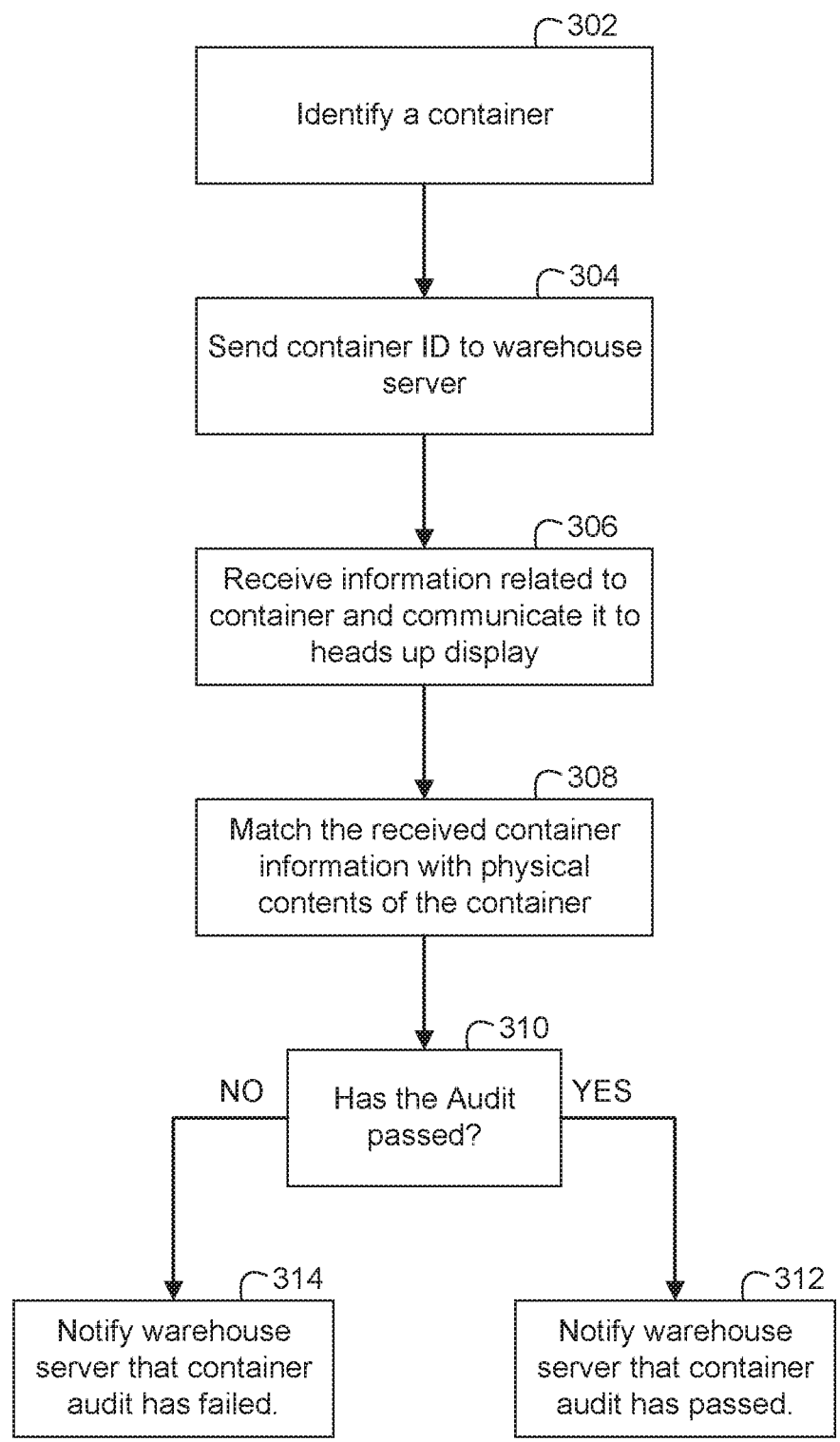
FIG. 3 is a flow diagram of a method for auditing containers in a warehouse in accordance with an embodiment of the present disclosure.

FIG. 3 is a flow diagram illustrating the steps to a method for auditing containers 110 in a warehouse. In step 302 of FIG. 3, a particular container 110a is identified with a scanner 106. As illustrated in FIG. 1, a scanner 106 retrieves a container ID from the container 110a. Each container 110 has a specific container ID to uniquely identify that container 110. As discussed herein, the scanner 106 may be a separate Bluetooth scanner or may be part of the heads up display 102 or portable computing device 104. In step 304 of FIG. 3, the retrieved container ID is sent by the portable computing device 104 to the warehouse server 120 via the network 122. The retrieved container ID is linked to container information for the particular container 110a. As noted above, the container information may include product 130 descriptions, product images, quantity of products (130a-130c) in the container 110a, and product warehouse locations.

In step 306 of FIG. 3, the warehouse server 120, based upon the received container ID, sends container information for the container 110a to the portable computing device 104, which communicates the container information to the heads up display 102 for viewing by the user/operator. As discussed above, the container information will include one or more of product 130a-130c descriptions and quantities of products (130a-130c) in the container 110a.

In step 308 of FIG. 3, the received container information, as displayed in the heads up display 102, is matched with the actual physical contents (130a-130c) of the container 110a. In an aspect of the present disclosure, each product 130a-130c in the container 110a may be individually scanned by the scanner 106 to match the contents of the container information with the physical contents (130a-130c) of the container 110a. In an aspect of the present disclosure, each product 130a-130c in the container 110a may be manually audited.

In step 310 of FIG. 3, a determination is made as to whether the audit has passed. In an aspect of the present disclosure, the audit has passed when the portable computing device 104 determines that the contents (130a-130c) of the container 110a match the container information. In an aspect of the present disclosure, the user/operator determines whether the audit passes.

As illustrated in FIG. 3, if the audit passes, then in step 312, using the interactive functionality of the heads up display 102, the warehouse server 120 is notified that the container 110a has passed the audit. In an aspect of the present disclosure, the portable computing device 104 notifies the warehouse server 120 that the container 110a has passed the audit. However, if the audit does not pass, then in step 314, again, using the heads up display 102, the warehouse server 120 is notified that the container 110a has not passed the audit. In an aspect of the present disclosure, the portable computing device 104 notifies the warehouse server 120 that the container 110a has not passed the audit. If the container 110a has not passed the audit, the warehouse system 120 will send a notification to the portable computing device 104, that is communicated to the heads up display 102, that the container 110 is to be routed to a quality control area of the warehouse for further review.

Using a Heads Up Display in a Quality Control Setting:

When utilizing a picking solution, in order to provide a quality control station for their customers, a remote terminal 150 may be deployed, which may be used for the validation. This remote terminal 150 is in a fixed location and requires containers 110 to be routed to this location. By utilizing a heads up display/portable computing device 102/104 (rather than a fixed terminal 150) to perform the quality checks, this quality process may occur at any location within the warehouse. There are two different processes that can be followed when performing a quality check: Blind & Open.

Using a Heads Up Display in a Blind Quality Check:

In a blind mode, once the operator identifies and/or scans a container 110a, the container information is delivered to the heads up display/portable computing device 102/104, but is kept hidden from the operator. The user/operator then starts to identify/scan the products (130a-130c) contained within the container 110a. Because this is a "blind" quality check, the user/operator must identify/scan each and every product (130a-130c) in the container 110a. Once all the products (130a-130c) have been identified, the user/operator informs the portable computing device 104 that the quality check is complete (that all of the products 130a-130c in the container have been checked) and the heads up display 102 is then presented with a Pass or Fail status. If the quality check passes, the operator may then allow the container 110a to be sent to its final destination. If the check fails, the operator may rectify the container 110a, as discussed below.

Figure 4:
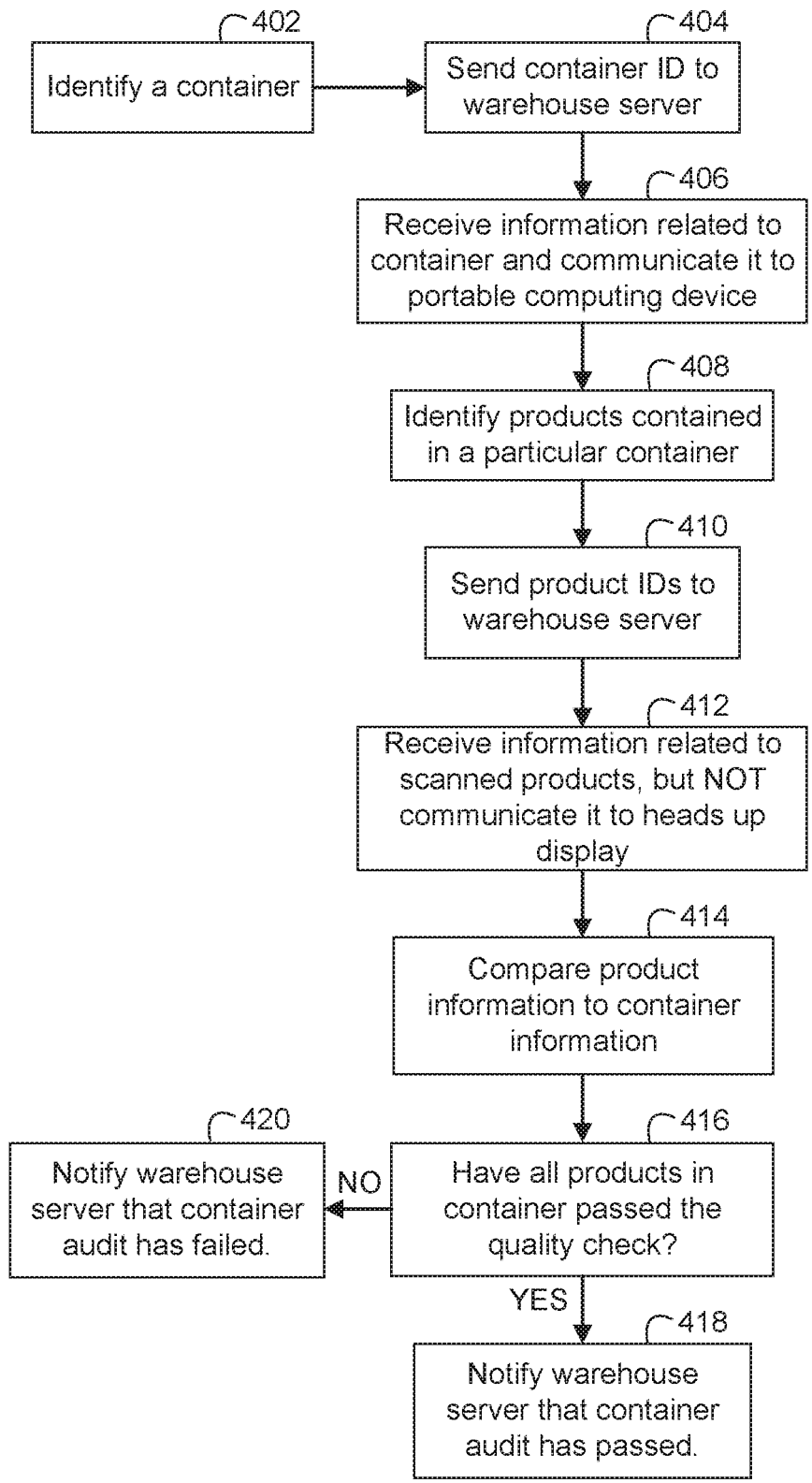
FIG. 4 is a flow diagram of a method for performing quality checks on the contents of a container in a warehouse in accordance with an embodiment of the present disclosure.

FIG. 4 illustrates the steps to a method for performing a blind quality check on the contents (130a-130) of a container 110a in a warehouse. In step 402 of FIG. 4, a container 110a is identified. In step 404 of FIG. 4, the acquired container ID is sent to the warehouse server 120. In step 406 of FIG. 4, the container information for the container ID is returned to the portable computing device 104. As discussed above, the returned container information will include product information for the contents of the container 110a. However, as also discussed above, for a blind quality check, the container information is not forwarded to the heads up display 102. In an aspect of the present disclosure, the container information may be optionally forwarded to the heads up display 102, but kept hidden from an operator/user.

In step 408 of FIG. 4, the products (130a-130c) of the container 110a are scanned with a scanner 106 to determine their product IDs. Similar to the scanning of containers 110, product IDs are returned by scanning products (130a-130c) of the selected container 110a. As also discussed herein, the scanner 106 is communicatively coupled to the portable computing device 104.

In step 410 of FIG. 4, product IDs for products (130a-130c) are sent to the warehouse server 120. As also discussed herein, the product IDs are sent by the portable computing device 104, via the network 122, to the warehouse server 120 for recording purposes. The retrieved product IDs are linked to product information for the particular products (130a-130c). A product ID may include a product description and product images. The product information may also include other product related information.

In step 412 of FIG. 4, product information for each product ID is received by the portable computing device 104 from the warehouse server 120. The product information is retained by the portable computing device 104 and not immediately communicated to the heads up display 102. In an aspect of the present disclosure, the product information may be optionally forwarded to the heads up display 102, but kept hidden from the operator/user.

In step 414 of FIG. 4, the portable computing device 104 compares the product information (actual product information) to the container information (assumed product information). In step 416 of FIG. 4, the portable computing device 104 determines whether all of the product information of products (130a-130c) in the container 110a matches the container information for the container 110a. If all of the products (130a-130c) in the container 110a pass the quality check, then in step 418 of FIG. 4, the portable computing device 104 notifies the warehouse server 120 that the container audit has passed. A notice is also sent from the portable computing device 104 to the heads up display 102 that the container's 110a quality check has passed. If not all of the products (130a-130c) in the container 110a have passed the quality check, then in step 420 of FIG. 4, the warehouse server 120 is notified by the portable computing device 104 that the container audit has not passed. The heads up display 102 is also notified by the portable computing device 104 that the container's 110a quality check has not passed. In an aspect of the present disclosure, if the container 110a passes the quality check, then the container 110a may be sent to its final destination. The portable computing device 104 may send an instruction to the heads up display 102 to move the container 110a to its final destination.

Using a Heads Up Display in an Open Quality Check:

In an open mode, once the user/operator identifies a container 110a, the user/operator is given all of the information pertaining to what is in the container 110a. This process is very similar to the "blind" audit process described herein, except that the container information (which includes product details) is sent and displayed in the heads up display 102 so that the container information may be used during a manual product inventory of the container 110a. Using this information, the user/operator manually validates the individual products (130a-130c) inside the container 110a. Once the validation occurs, the user/operator identifies to the warehouse server 120, via the heads up display/portable computing device 102/104, whether the container 110a has passed or failed the quality check. If passed, the portable computing device 104 may send an instruction to the heads up display 102 to send the container 110a to its final destination. If failed, the portable computing device 104 may send an instruction to the heads up display 102 to rectify the container 110a as discussed below.

Figure 5:
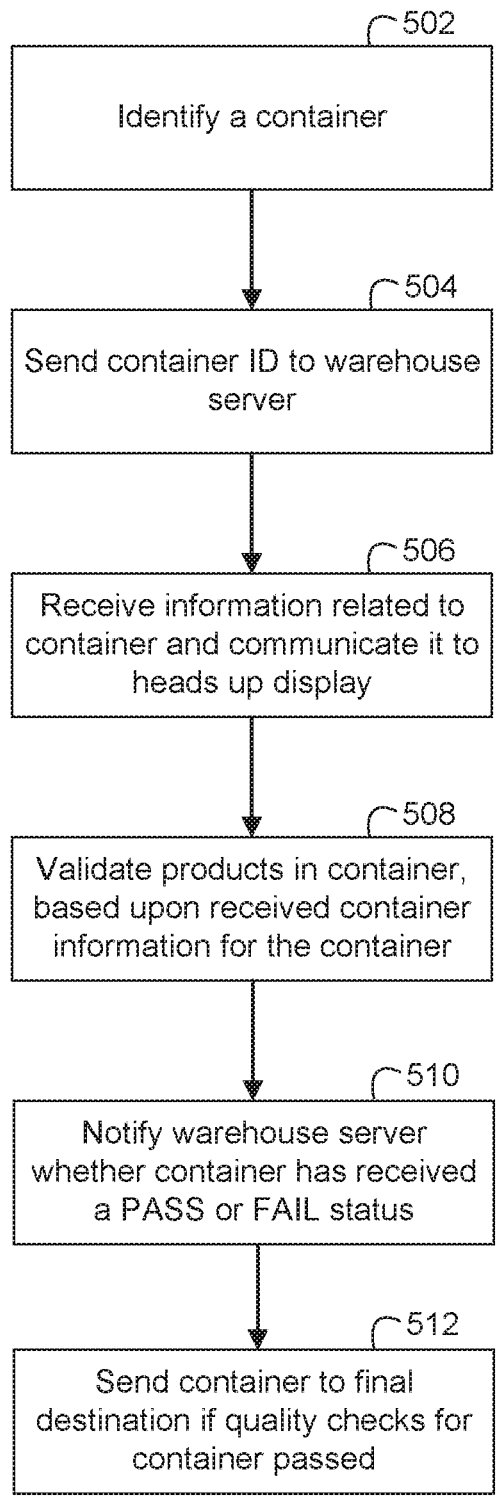
FIG. 5 is a flow diagram of a method for performing quality checks on the contents of a container in a warehouse in accordance with an embodiment of the present disclosure.

FIG. 5 illustrates the steps to a method for performing "open" quality checks on the contents (130a-130c) of a container 110a in a warehouse. In step 502 of FIG. 5, a container 110a is identified with a scanner 106. As illustrated in FIG. 1, the scanner 106 retrieves a container ID from the container 110a. Each container 110 has a specific container ID to uniquely identify that container 110. As discussed herein, a container ID may be manually read off a container 110a by a user/operator and entered with the heads up display 102 to provide it to the portable computing device 104.

In step 504 of FIG. 5, the retrieved container ID is sent by the portable computing device 104 to the warehouse server 120 via the network 122. The retrieved container ID is linked to container information for the particular container 110a. As noted above, container information may include container state, target destination, and identifying contents (130a-130c) of the container.

In step 506 of FIG. 5, the warehouse server 120, based upon the received container ID, sends container information for the container 110a to the portable computing device 104, which communicates the container information to the heads up display 102 for viewing by the person.

In step 508 of FIG. 5, the products (130a-130c) of the container 110a are manually validated, based upon the received container information for the container 110a. The heads up display 102 will indicate when the last known product (130a-130c) in the container 110a has been validated, and will ask if additional product is in the container (130a-130c). Then in step 510 of FIG. 5, the method continues by notifying the warehouse server 120 and the heads up display 102, via the portable computing device 104, whether the container 110a has received a PASS or FAIL status. As discussed above, if the products (130a-130c) match the container information (which includes product information for the container) then the quality check is determined to have passed. In step 512 of FIG. 5, if the quality checks for the container 110a passed, then the container 110a may be sent on to its final destination. In an aspect of the present disclosure, the portable computing device 104 sends an instruction to the heads up display 102 to send the container 110a to its final destination if the quality checks for the container 110a have passed.

Rectification Procedures:

When a container fails its quality control process, there are several actions allowed by the warehouse system 100. These three actions also depend on the customer's processes.

1. The order is canceled and any new pick request is sent to the picking system to have the order reprocessed. If this occurs, the operator is informed via the heads up display 102 to set the container 110a aside and the product (130a-130c) inside the container 110a will be restocked.

2. If after the quality check it is determined that there is too much product (130a-130c) inside the container 110a (i.e., system recorded two items but there are three items are in the container):

A. If the check was performed in a "blind" mode, the heads up display 102 will identify to the operator which product (130a-130c) and how many need to be removed from the container 110a. The operator verifies each of the products (130a-130c) removed via the heads up display 102. Once complete, the heads up display 102 informs the operator that the container 110a is able to be sent to its final destination.

B. If the check was performed in an "open" mode, the operator removes the excess product (130a-130c) from the container 110a and informs the warehouse system 100 once these tasks are complete.

3. If after the quality check, it is determined that there is not enough product (130a-130c) inside the container 110a (i.e. the system recorded 2 items but 1 item was found in the container 110a):

A. If the check was performed in a "blind" mode, the heads up display 102 identifies the first item (130a-130c) that is correct. This information includes the current quantity, recorded quantity, and the warehouse location of the product (130a-130c). If the warehouse system 100 in question is also controlling inventory, the user/operator will also have access to product inventory quantities. The user/operator may then choose to either mark the product (130a-130c) as short or proceed to the warehouse location and acquire the required quantity. Because the heads up display 102 is portable, the user/operator will always have the information with them as they move throughout the warehouse addressing quality control issues. Once the proper amount of product (130a-130c) has been added to the container 110a, the user/operator then moves through any remaining items (130a-130c) and addresses any remaining quality issues. Once all issues have been addressed, the container 110a is then allowed to proceed to its final destination.

B. If the check was performed in an "open" mode, the operator must first identify which item (130a-130c) was misreported. Once that occurs, the same information as above in the "blind" mode is presented to the user/operator and the user/operator works to fix the issue by either notifying the warehouse system 100 of the correct quantity (of products 130a-130c) or by proceeding to the warehouse location and putting the proper quantity (of products 130a-130c) in the container 110a.

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. An inventory warehouse management system comprising:
   a portable computing device and a heads up display, wherein the portable computing device is communicatively coupled to the heads up display, and wherein the heads up display is configured to display and interact with information content received from the portable computing device; and
   a scanner communicatively coupled to the portable computing device, wherein the scanner is operable to identify a container identification (ID) of a container in a warehouse, and wherein the portable computing device is operable to send the container ID to a warehouse server via a network;
   wherein the portable computing device is operable to receive container information from the warehouse server in response to the container ID, and is operable to communicate the container information to the heads up display; and
   wherein the heads up display is operable to update the information content, wherein the updated information content includes a selective container delivery confirmation, wherein the portable computing device is configured to communicate the container delivery confirmation to the warehouse server when the heads up display selectively initiates the container delivery confirmation, wherein the heads up display is operable to display a target destination, wherein the target destination is based in part on the container information, and wherein the delivery confirmation is initiated at the time of delivery at the target destination.

2. The inventory warehouse management system as claimed in claim 1, wherein the container information comprises one or more of a current container state, a target destination, and container contents, and wherein container contents comprise at least one of product descriptions, product images, and product quantity.

3. The inventory warehouse management system as claimed in claim 1, wherein the portable computing device is physically separate from the heads up display and is communicatively coupled to the heads up display via a wireless network.

4. The inventory warehouse management system as claimed in claim 3, wherein the wireless network is a Bluetooth network.

5. The inventory warehouse management system as claimed in claim 1, wherein the portable computing device is physically separate from the heads up display and is communicatively coupled to the heads up display via a wired network.

6. The inventory warehouse management system as claimed in claim 1, wherein the scanner is physically integrated into the heads up display.

7. The inventory warehouse management system as claimed in claim 1, wherein the portable computing device is physically integrated into the heads up display.

8. The inventory warehouse management system as claimed in claim 1, wherein at least one of the portable computing device and the scanner is physically integrated into the heads up display.

9. The inventory warehouse management system as claimed in claim 1, wherein the heads up display, via the portable computing device, is operable to provide the warehouse server with an audit result for a first audited container, wherein the portable computing device is operable to perform an audit of the first audited container that comprises the received container information compared with contents of the first audited container, wherein the audit result is a passed audit when the portable computing device determines that the contents of the first audited container match the container information, and wherein the audit result is a failed audit when the portable computing device determines that the contents of the first audited container do not match the container information; and
   wherein the portable computing device is operable to receive instructions from the warehouse server to route the first audited container to a quality control area when the audit result is a failed audit, and wherein the portable computing device is operable to communicate the received instruction to the heads up display.

10. The inventory warehouse management system as claimed in claim 1, wherein the scanner is operable to identify a product ID for each product in a first container for a quality check of the first container, wherein the portable computing device is operable to send the product IDs to the warehouse server via the network, wherein the heads up display, via the portable computing device, is operable to indicate when a last product of the quality check has been identified, and wherein the portable computing device is operable to mask the container information of the first container from the heads up display during the quality check;
   wherein the heads up display is operable to display a quality check result indication, wherein the portable computing device is operable to perform a quality check that comprises a comparison of the identified product IDs and the container information, and wherein the portable computing device is operable to send the quality check result to the warehouse server; and
   wherein the portable computing device is operable to receive instructions from the warehouse server to route the first container to its final destination when the quality check has passed, and wherein the portable computing device is operable to communicate the received instruction to the heads up display.

11. The inventory warehouse management system as claimed in claim 1, wherein the portable computing device is operable to perform a quality check comprising a comparison of the contents of a first container and corresponding container information, wherein the heads up display is operable to indicate when a last known product in the first container has been validated during the quality check, indicate whether there is additional product in the first container, and indicate whether the quality check has passed or failed;
   wherein the portable computing device is operable to send the quality check result to the warehouse server; and
   wherein the portable computing device is operable to receive instructions from the warehouse server to route the first container to its final destination when the quality check has passed, and wherein the portable computing device is operable to communicate the received instructions to the heads up display.

12. The inventory warehouse management system as claimed in claim 1, wherein the scanner is configured to determine the container ID from the container using at least one of: optical scanning of barcodes and radio signal interrogation of RFID tags.

13. An inventory warehouse management system comprising:
   a portable computing device and a heads up display, wherein the portable computing device is communicatively coupled to the heads up display, wherein the heads up display is configured to display and interact with information content received from the portable computing device; and a scanner communicatively coupled to the portable computing device, wherein the scanner is operable to identify a container identification (ID) of a container in a warehouse, and wherein the portable computing device is operable to send the container ID to a warehouse server via a network;

wherein the portable computing device is operable to receive container information from the warehouse server in response to the container ID, and is further operable to communicate the container information to the heads up display;

wherein the portable computing device is operable to perform an audit that comprises comparing the contents of a first container with corresponding container information; and wherein the heads up display, via the portable computing device, is operable to provide the warehouse server with an audit result for the first container, wherein the audit result is a passed audit when the portable computing device determines that the contents of the first container match the container information, and wherein the audit result is a failed audit when the portable computing device determines that the contents of the first container do not match the container information; and wherein the portable computing device is operable to receive instructions from the warehouse server to route the audited first container to a quality control area when the audit result is a failed audit, and wherein the portable computing device is operable to communicate the received instruction to the heads up display.

14. The inventory warehouse management system as claimed in claim 13, wherein the heads up display is operable to update the information content, wherein the updated information content includes a selective container delivery confirmation, wherein the portable computing device is operable to send the container delivery confirmation to the warehouse server when the heads up display selectively initiates the container delivery confirmation, wherein the heads up display is operable to display a target destination, wherein the target destination is based in part on the container information, and wherein the delivery confirmation is initiated at the time of delivery at the target destination.

15. The inventory warehouse management system as claimed in claim 13, wherein the container information comprises one or more of a current container state, a target destination, and container contents, and wherein container contents comprise at least one of product descriptions, product images, and product quantity.

16. The inventory warehouse management system as claimed in claim 13, wherein the portable computing device is physically separate from the heads up display and is communicatively coupled to the heads up display via a wireless network.

17. The inventory warehouse management system as claimed in claim 16, wherein the wireless network is a Bluetooth network.

18. The inventory warehouse management system as claimed in claim 13, wherein the portable computing device is physically separate from the heads up display and is communicatively coupled to the heads up display via a wired network.

19. The inventory warehouse management system as claimed in claim 13, wherein at least one of the portable computing device and the scanner is physically integrated into the heads up display.

20. The inventory warehouse management system as claimed in claim 13, wherein the scanner is operable to identify a product ID for each product in the first container during the audit of the first container, wherein the portable computing device is operable to send the product IDs to the warehouse server via the network, and wherein the heads up display, via the portable computing device, is operable to indicate when a last product of the audit has been identified.

* * * * *